United States Patent
Laws et al.

(10) Patent No.: US 8,528,684 B2
(45) Date of Patent: Sep. 10, 2013

(54) CHARGE PRESSURE REDUCTION CIRCUIT FOR IMPROVED TRANSMISSION EFFICIENCY

(75) Inventors: Nathan H. Laws, Dubuque, IA (US); Jonathan R. Copeland, Peosta, IA (US); Jacob J. Foxen, Parkersburg, IA (US); Anthony W. Brandon, Sherrill, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/307,443

(22) Filed: Nov. 30, 2011

(65) Prior Publication Data
US 2013/0133973 A1 May 30, 2013

(51) Int. Cl.
*B60Q 5/00* (2006.01)

(52) U.S. Cl.
USPC ........... 180/326; 180/321; 180/324; 180/330; 180/338; 477/77; 477/143

(58) Field of Classification Search
USPC ................. 180/321, 324, 326, 330, 338, 339; 172/434, 435; 477/70, 77, 86, 143, 180, 477/166, 157–158; 74/730.1, 731.1, 732.1, 74/733.1
See application file for complete search history.

(56) References Cited

U.S. PATENT DOCUMENTS

| | | | | |
|---|---|---|---|---|
| 3,257,013 A | * | 6/1966 | Arnold | 414/694 |
| 4,479,349 A | * | 10/1984 | Westveer | 60/420 |
| 4,699,561 A | | 10/1987 | Tee | |
| 5,063,742 A | * | 11/1991 | Yoshimatsu | 60/466 |
| 5,082,097 A | | 1/1992 | Goeckner et al. | |
| 5,092,408 A | * | 3/1992 | Tatara et al. | 172/2 |
| 5,377,777 A | * | 1/1995 | Moore et al. | 180/272 |
| 5,471,908 A | * | 12/1995 | Lech | 91/516 |
| 5,848,531 A | * | 12/1998 | Nakamura et al. | 60/426 |
| 6,029,445 A | * | 2/2000 | Lech | 60/422 |
| 6,029,531 A | * | 2/2000 | Riedhammer | 74/335 |
| 6,430,850 B1 | * | 8/2002 | VanDerZyl et al. | 37/410 |
| 6,694,240 B1 | * | 2/2004 | Swick et al. | 701/50 |
| 6,851,495 B2 | * | 2/2005 | Sprinkle et al. | 180/53.2 |
| 7,165,530 B2 | * | 1/2007 | Jensen et al. | 123/339.14 |
| 7,387,348 B2 | * | 6/2008 | Archer et al. | 303/20 |
| 7,779,958 B2 | * | 8/2010 | Kitano et al. | 180/339 |
| 7,857,086 B2 | * | 12/2010 | Wakuta et al. | 180/273 |
| 8,041,485 B2 | * | 10/2011 | Prasetiawan et al. | 701/50 |

(Continued)

FOREIGN PATENT DOCUMENTS

| | | | |
|---|---|---|---|
| EP | 0826907 A3 | | 9/1998 |
| GB | 2006362 A | * | 5/1979 |
| WO | 2013021692 A1 | | 2/2013 |

OTHER PUBLICATIONS

Combined Search and Examination Report in Counterpart United Kingdom Patent Application No. 1221468.0 (Mar. 26, 2013) (6 pages).

*Primary Examiner* — James English
(74) *Attorney, Agent, or Firm* — Quarles & Brady LLP

(57) ABSTRACT

A charge pressure reduction circuit for a loader backhoe in which a directional control valve causes the charge pump to operate at a system pressure high enough to adequately supply a clutch circuit when conditions indicate the vehicle is operating in a loader or transport mode. The directional control valve causes the charge pump to operate at a lower pressure as, for example, required for a lubrication circuit when conditions indicate the vehicle is in a backhoe operating mode.

14 Claims, 3 Drawing Sheets

(56) References Cited

U.S. PATENT DOCUMENTS

| | | | |
|---|---|---|---|
| 8,312,793 B2* | 11/2012 | Azuma et al. | 74/730.1 |
| 2005/0115760 A1* | 6/2005 | Sprinkle et al. | 180/338 |
| 2006/0063642 A1* | 3/2006 | Hawkins | 477/107 |
| 2008/0070227 A1 | 3/2008 | Rauch | |
| 2009/0012679 A1* | 1/2009 | Prasetiawan et al. | 701/50 |
| 2013/0004279 A1* | 1/2013 | Naito et al. | 414/685 |

* cited by examiner

CHARGE PRESSURE REDUCTION CIRCUIT FOR IMPROVED TRANSMISSION EFFICIENCY

FIELD OF THE INVENTION

The invention relates to transmission efficiency and specifically addresses transmission efficiency gained through decreasing transmission power supply at times when the transmission is not used or needed.

BACKGROUND OF THE INVENTION

In conventional loader backhoes, as well as other work vehicles, a transmission charge pump provides a full system pressure to power, i.e., activate, clutches at all times.

SUMMARY OF THE INVENTION

The inventors have recognized that charge pressures sufficient for clutch operation for work vehicles with similar utilizing transmissions need only be maintained during times of demand on the transmission. Further, the inventors have recognized that the transmission clutches for loader backhoes are usually only active during loader operations as the transmission is not usually employed during backhoe operations. Even during loader operations, there are times when the transmission is not employed for work. The invention described and claimed herein includes a device and method for increasing transmission efficiency by lowering fluid pressures in a transmission circuit during times of no demand or lower demand on the transmission.

DESCRIPTION OF THE PREFERRED EMBODIMENT

Figure 1:
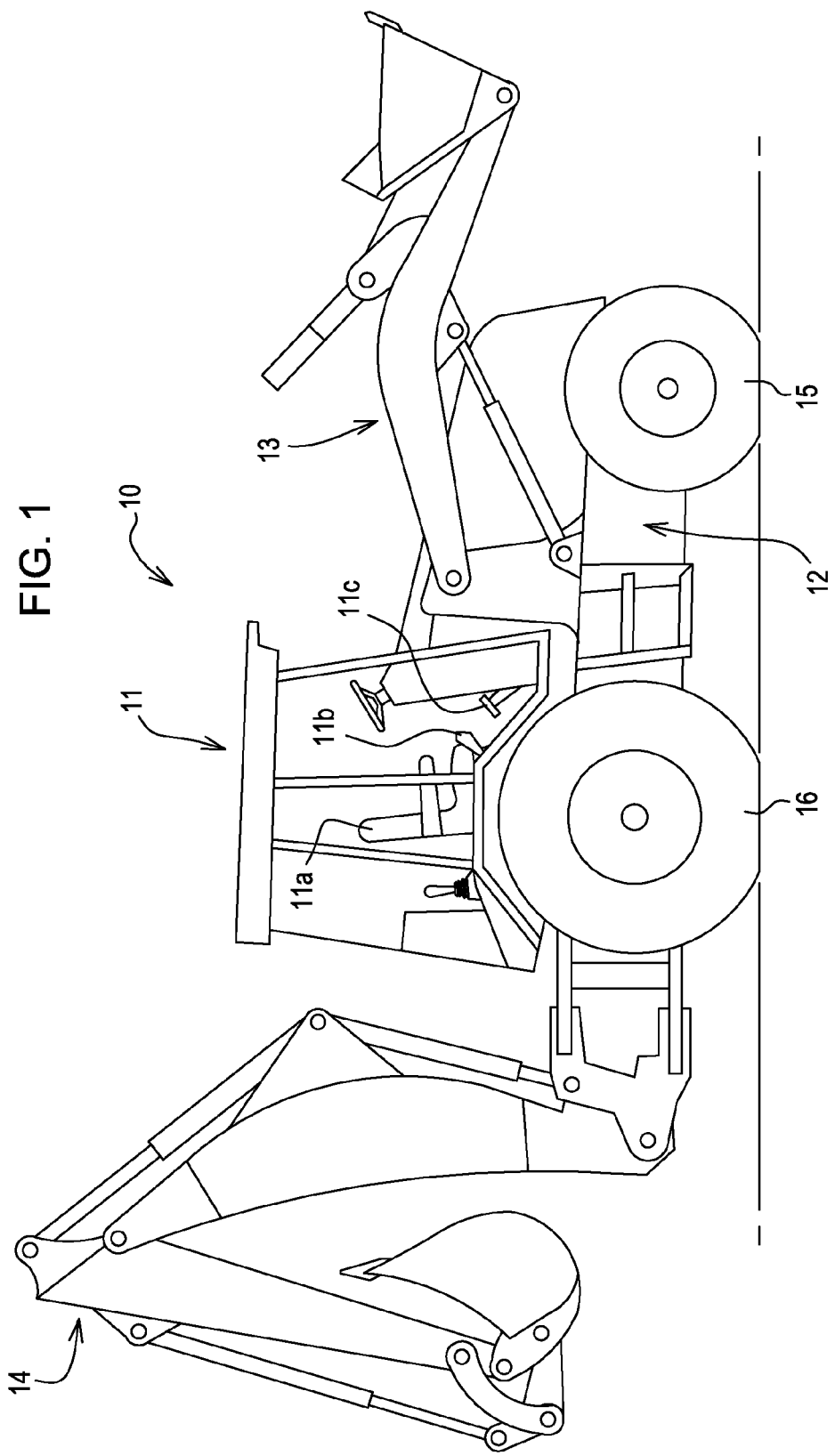
FIG. 1 illustrates an exemplary embodiment of a work vehicle which could benefit from use of the invention.

FIG. 1 illustrates an exemplary embodiment of a work vehicle 10 which may benefit from use of the invention and may be a loader backhoe including: a cab 11; an operator seat 11a; a transmission control device 11b; a service brake control device 11c; a park brake control device (not shown); a frame 12; a loader linkage assembly 13 which may be attached to the frame 12 as shown; a backhoe linkage assembly 14 which may be attached to the frame 12 as shown; front and rear wheels 15, 16 which may support the frame 12 and apply power supplied by an engine 20 via a conventional torque converter 30 and a transmission 40 to locomote the vehicle 10; a service brake 50 to which the service brake control device 11c is operably connected; and a park brake 51 to which the park brake control device (not shown) is operably connected.

Figure 2:
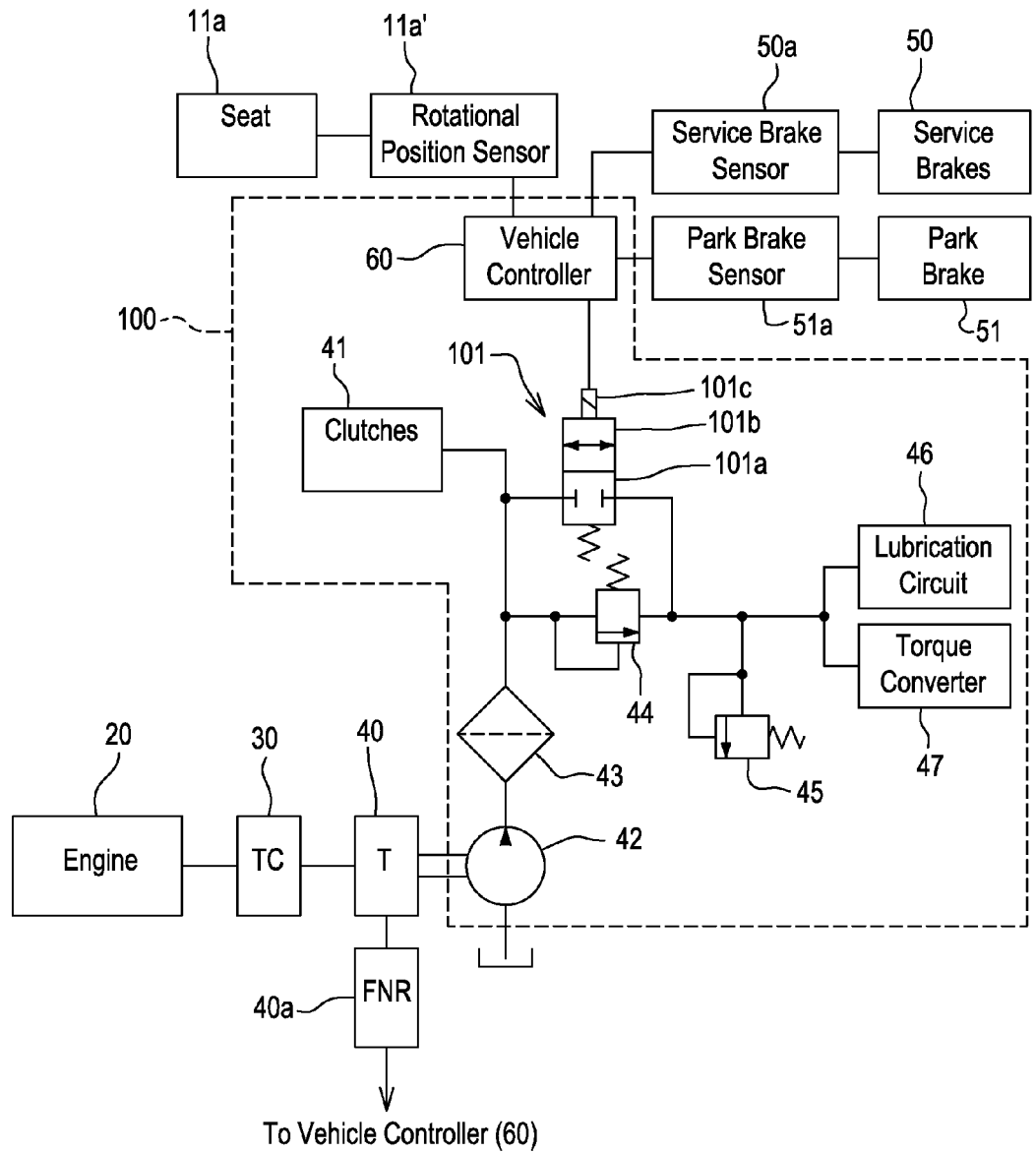
FIG. 2 illustrates an exemplary embodiment of a charge reduction circuit for reducing pressure supplied to the clutches at times when the transmission is not required.

FIG. 2 illustrates an exemplary embodiment of a charge pressure reduction circuit 100 including: a transmission charge pump 42; a fluid filter 43; a first pressure relief valve 44 which may be set to a first pressure P1, i.e., a system pressure, for the transmission 40; a second pressure relief valve 45 which may be set to a second pressure P2, i.e., a pressure required for operation of at least one of a conventional transmission lubrication circuit 46 and a conventional torque converter circuit 47, i.e., a pressure significantly lower than the first pressure P1; an electro-hydraulic two way directional control valve 101 having a closed position 101a, an open position 101b and a solenoid 101c; and a conventional vehicle controller 60 operably connected to the directional control valve 101 at the solenoid 101c. In this exemplary embodiment of the invention, the directional control valve 101 may be biased toward the closed position 101a and may move toward the open position 101b only when electrical energy is applied to a solenoid 101c, via action of the vehicle controller 60, and the force biasing the valve 101 to the closed position 101a is overcome or exceeded. It is contemplated that a directional control valve (not shown) could be biased toward an open position and closing only with the application of electrical energy to a solenoid. It is further contemplated that a modified first pressure relief valve 44 may serve as an alternative to the directional control valve 101 if it included lockout features, i.e., features to keep it closed such as, for example, a solenoid in communication with a vehicle controller and acting in concert with the biasing mechanism keeping the valve in a closed position until the pressure builds to the relief point at which this valve may be set.

The vehicle controller 60 may be in communication with one or more of a conventional rotational position sensor 11a' for the seat 11a, a service brake sensor 50a and a park brake sensor 51a or other sensor or device (not shown) and may be operably connected to the directional control valve 101. It may, upon vehicle ignition, be programmed, via software, to function as described below. The vehicle controller 60 may determine the operating mode of the work vehicle 10 via signals received from, for example, the rotational position sensor 11a' for the seat 11a which may be mounted to one or both of the seat 11a and the frame 12, or other vehicle mode indicators such as a switch (not shown) worked by the operator or, perhaps, an application of the park brake 51. When, as in this particular embodiment, the rotational position sensor 11a' detects the seat 11a is in the backhoe operating position, i.e., facing the backhoe linkage assembly 14, the rotational position sensor 11a' may send a signal to the vehicle controller 60 indicating the seat 11a is in the backhoe operating position (i.e., the vehicle 10 is in the backhoe operating mode and is not making a demand on the transmission 40) and the vehicle controller 60 may supply electrical energy to the solenoid 101c of the directional control valve 101. As indicated above, the application of electrical energy to the solenoid 101c may have the effect of moving the directional valve 101 from the closed position 101a the open position, thereby lowering the maximum pressure for the charge pump 42 from the first pressure P1 to the second pressure P2. Under these circumstances, the vehicle controller 60 may discontinue supplying electrical energy to the solenoid 101c upon the occurrence of one of the following: (1) the seat 11a leaves the backhoe operating position, i.e., the rotational position sensor 11a' indicates that the seat is not in the backhoe operating position; (2) the transmission 40 is shifted from neutral <N> to a forward <F> or reverse gear <R> via a transmission gear shifter 40a; or (3) the service break sensor 50a indicates that the service brakes 50 are depressed. The vehicle 10 may also have a park brake 51 operably connected to a conventional park brake sensor 51a which may, upon release of the park brake 51, send a signal to the vehicle controller 60, causing it to discontinue supplying electrical energy to the solenoid 101c. Under these conditions, the vehicle 10 is, very likely, moving, or about to be moving, in a forward or reverse direction under power and, thus, making a demand on the transmission 40 and its clutches 41.

Figure 3:
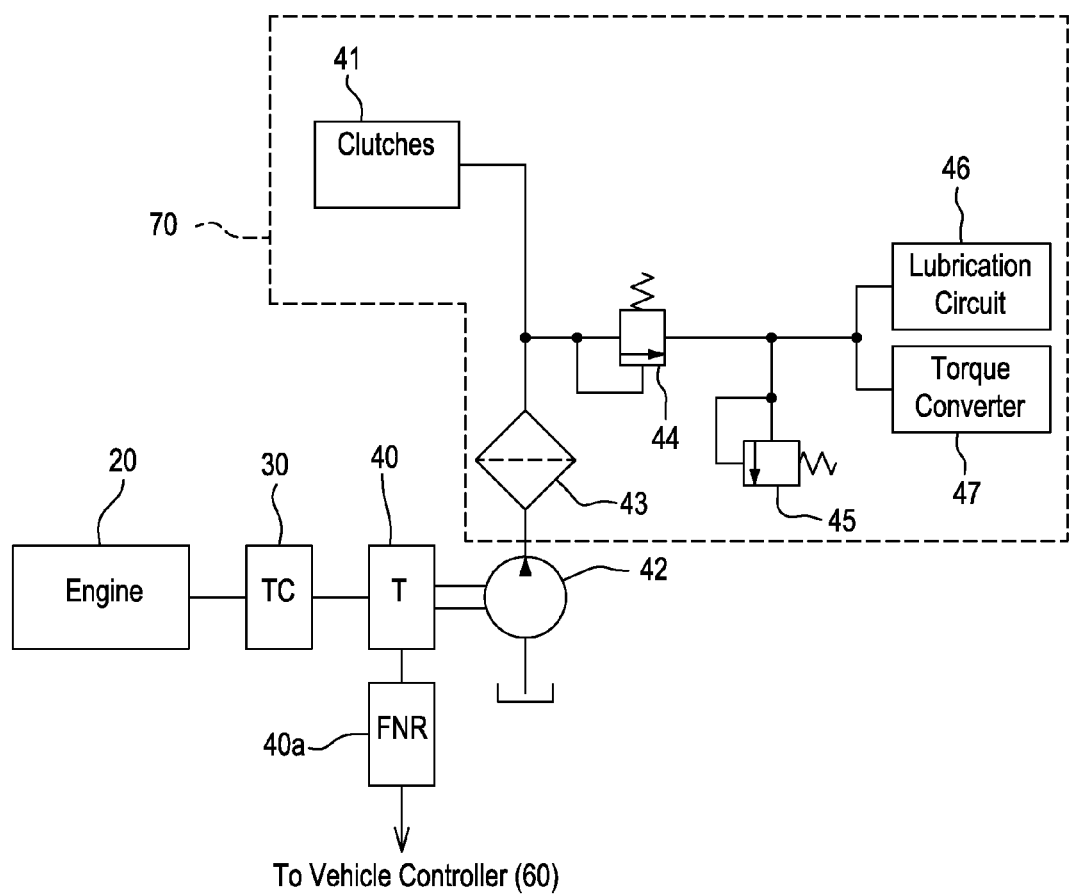
FIG. 3 illustrates an exemplary embodiment of a conventional version of the circuit illustrated in FIG. 2.

During transport operations and portions of the loader mode, the vehicle 10 may locomote and the vehicle controller 60 may not supply electrical energy to the directional control valve 101. Under these conditions, the charge pressure reduction circuit 100 may duplicate the action of the exemplary conventional charge pressure circuit 70 illustrated in FIG. 3 as the directional valve 100 may remain at the closed position 101a, thereby, driving the transmission charge pump 42 to operate at the first pressure P1 as the first pressure relief valve 44 may open at the first pressure P1. However, during backhoe operations, when the clutches 41 are not likely to be engaged, the vehicle controller 60 may apply electrical energy to the directional control valve 101 at the solenoid 101c moving the directional control valve 101 to the open position 101b, causing fluid to bypass the clutches 41 which require a higher system pressure. Also, even if the vehicle is in the loader mode, i.e., the rotational position sensor 11a' indicates the seat 11c is in the loader position, the vehicle controller 60 may apply electricity to the directional control valve 101 when the park brake sensor 51a signals that the park brake 51 is engaged as this indicates that the vehicle is making no demands on the transmission 40. Under such conditions, the directional control valve 101 may open giving pressure control to the second pressure relief valve 45 and, thereby, causing the pressure at which the charge pump 42 operates to drop to the second pressure P2 as the fluid bypasses the first pressure relief valve 44 and the clutches 41 and the second pressure relief valve 45 opens at the lower second pressure P2. In this particular embodiment, exemplary first and second pressures, P1 and P2 may be 20 bars and 11 bars, respectively.

As implied above, the invention may also be advantageous on other work vehicles. For example, an application of the park brake 51 on a loader may indicate that the vehicle 10 is not making a demand on the transmission 40 for locomotion and thus, the vehicle controller 60 may, upon receiving a signal from the park brake sensor 51a, cause electrical energy to be applied to the solenoid 101c of the directional control valve 101. Of course, a release of the park brake 51 may result in the vehicle controller 60 discontinuing the application of electrical energy to the solenoid 101c and, thus, may result in the charge pressure reduction circuit 100 moving to the system pressure. It is to be noted here that, while an electronic controller is mentioned in the described embodiment, an electronic controller is not a necessity for the invention. A set of relay switches or mechanical and hydraulic linkages could effect equivalent results in alternative pressure reduction systems.

Having described the preferred embodiment, it will become apparent that various modifications can be made without departing from the scope of the invention as defined in the accompanying claims. While the embodiments described may involve a loader backhoe and a loader, the invention may be used in other work vehicles with transmissions.

The invention claimed is:
1. A work vehicle comprising:
an operator seat having a first rotational position and a second rotational position;
a rotational position sensor for detecting a rotational position of the operator seat and generating a signal indicating the rotational position of the operator seat;
a controller in communication with the rotational position sensor;
a charge pump;
a transmission having a clutch circuit, a first pressure relief valve capable of relieving pressure at a first pressure, a second pressure relief valve capable of relieving pressure at a second pressure lower than the first pressure, an electro-hydraulic directional control valve biased to a first position and moving to a second position when the seat is in the second rotational position, and a lubrication circuit, the clutch circuit operating at the first pressure, the lubrication circuit operating at the second pressure, the controller causing electro-hydraulic directional control valve to assume the first position and allow the charge pump to operate at the first pressure when the rotational position sensor detects that the operator seat is in the first position.

2. The work of claim 1, wherein the controller causes the electro-hydraulic directional control valve to assume the second position and allow the charge pump to operate at the second pressure when the rotational position sensor detects that the operator seat is in the second rotational position.

3. A work vehicle comprising;
a vehicle mode sensor designed to detect an operating mode of the work vehicle, the work vehicle having a first operating mode and a second operating mode;
a charge pump;
a mode sensor capable of detecting the operating mode of the vehicle and, upon detecting the first operating mode, sending a first signal indicating the vehicle is in the first operating mode and, upon detecting the second operating mode, sending a second signal indicating the vehicle is in the second operating mode;
a transmission including a hydraulic circuit with a bypass control valve, the hydraulic circuit capable of operating at a first hydraulic pressure and a second hydraulic pressure, the second hydraulic pressure lower than the first hydraulic pressure, the bypass control valve having a first position and a second position, the first position causing the hydraulic circuit to operate at the first hydraulic pressure, the second position causing the hydraulic circuit to operate at the second hydraulic pressure; and
a controller in communication with the mode sensor and operably connected to the bypass valve, the controller causing the bypass valve to assume the first position upon receiving the first signal from the mode sensor, the controller causing the bypass valve to assume the second position upon receiving the second signal from the mode sensor.

4. The work vehicle of claim 3, wherein the controller causes the bypass valve to assume the second position upon receiving the second signal from the mode sensor.

5. The work vehicle of claim 3, wherein the mode sensor is a rotational position sensor for the seat.

6. The work vehicle of claim 3, wherein the mode sensor is a service brake application sensor capable of generating a first signal upon detecting that a service brake is applied.

7. The work vehicle of claim 3, wherein the mode sensor is a park brake sensor.

8. A work vehicle having a first operating mode and a second operating mode, comprising:
a vehicle mode sensor capable of detecting an operating mode of the work vehicle, the mode sensor capable of generating a first signal upon detecting the vehicle is in the first operating mode and generating a second signal if the vehicle is in the second operating mode;
a transmission including a hydraulic circuit with a flow control device and a hydraulic pump, the hydraulic pump capable of operating at a first hydraulic pressure and a second hydraulic pressure, the second hydraulic pressure lower than the first hydraulic pressure, the flow control device having a first condition and a second condition, the first condition causing the hydraulic pump to operate at the first hydraulic pressure, the second condition causing the hydraulic pump to operate at the second hydraulic pressure; and a controller in communication with the mode sensor and operably connected to the flow control device, the controller causing the flow control device to enter the first condition upon receiving a first signal from the mode sensor, the controller causing the flow control device to enter the second condition upon receiving a second signal from the mode sensor.

9. The work vehicle of claim 8, further including an operator seat having a first rotational position.

10. The work vehicle of claim 9, wherein the mode sensor is a rotational position sensor for the seat capable of generating the first signal when the operator seat is in the first rotational position.

11. The work vehicle of claim 8, further including an operator seat having a second rotational position.

12. The work vehicle of claim 11, wherein the mode sensor is a rotational position sensor for the operator seat capable of generating the second signal upon detecting that the operator seat is in the second rotational position.

13. The work vehicle of claim 8, wherein the mode sensor is service brake application sensor capable of generating the first signal upon detecting that a service brake is applied.

14. The work vehicle of claim 8, wherein the mode sensor is a park brake application sensor capable of generating the second signal upon detecting that the park brake is applied.

* * * * *

UNITED STATES PATENT AND TRADEMARK OFFICE
CERTIFICATE OF CORRECTION

PATENT NO. : 8,528,684 B2  
APPLICATION NO. : 13/307443  
DATED : September 10, 2013  
INVENTOR(S) : Nathan H. Laws et al.

It is certified that error appears in the above-identified patent and that said Letters Patent is hereby corrected as shown below:

In the Specification

Col. 2, line 43, "11a" should read --11c--

In the Claims

Col. 4, line 10, Claim 1, "causing electro-hydraulic" should read --causing the electro-hydraulic--

Col. 5, line 2, Claim 8, "pressure lower" should read --pressure being lower--

Col. 5, line 32, Claim 14, "the park" should read --a park--

Signed and Sealed this  
Twenty-fifth Day of February, 2014

Michelle K. Lee  
*Deputy Director of the United States Patent and Trademark Office*